United States Patent [19]
Hoffman

[11] 3,929,201
[45] Dec. 30, 1975

[54] RADIATOR MOUNTINGS FOR INTERNAL COMBUSTION ENGINES

[75] Inventor: Willi Hoffman, Bauschheim, Germany

[73] Assignee: General Motors Corporation, Detroit, Mich.

[22] Filed: Feb. 10, 1975

[21] Appl. No.: 548,685

[30] Foreign Application Priority Data
Mar. 1, 1974 Germany............................ 2409822

[52] U.S. Cl................................ 180/68 R; 180/68 R
[51] Int. Cl.².......................................... B60K 11/04
[58] Field of Search ................ 180/68 R, 68 P, 54 A

[56] References Cited
UNITED STATES PATENTS
| | | | |
|---|---|---|---|
| 988,119 | 3/1911 | Livingston et al. | 180/68 R |
| 2,755,874 | 7/1956 | Adloff | 180/68 R |
| 3,123,170 | 3/1964 | Bryant | 180/68 R |
| 3,340,948 | 9/1967 | Deckert et al. | 180/68 R |

FOREIGN PATENTS OR APPLICATIONS
| | | | |
|---|---|---|---|
| 883,570 | 7/1953 | Germany | 180/68 R |
| 1,148,894 | 5/1963 | Germany | 180/68 R |

Primary Examiner—Leo Friaglia
Assistant Examiner—Milton L. Smith
Attorney, Agent, or Firm—K. H. MacLean, Jr.

[57] ABSTRACT

In a motor vehicle having a body with a horizontal frame part forming part of a lower mounting for the base of a radiator and two spaced vertical frame parts forming parts of two lateral mountings for the radiator, the radiator is mounted at its base by means of a pin fixed on the base of the radiator and engaging in a rubber block fixed on the horizontal frame part, the two side portions of the radiator carrying hollow cylindrical blocks which are engaged by the spigot ends of plugs which are inserted through corresponding openings in the vertical frame parts from the outboard sides thereof and are clamped to the vertical frame parts by formations providing a bayonet type connection.

5 Claims, 5 Drawing Figures

RADIATOR MOUNTINGS FOR INTERNAL COMBUSTION ENGINES

This invention relates to motor vehicle radiator mountings and more particularly to a resilient three-point radiator mounting having two rubber elements held in lateral and vertical guides and a rubber bearer supporting the radiator base.

A known resilient, three-point radiator mounting of this kind, shown in German specification DAS 1 148 894, consists of two cylindrical rubber elements secured to the vehicle bodywork, laterally of the radiator and engaging in U-shaped holding plates arranged on the radiator fixing strap, and of a rubber and metal component which forms the radiator mounting and has metal plates each connected to the fixing strap and to a fixed part of the vehicle frame by a bolt in the region of the radiator base. With this arrangement the spacing of the two rubber elements in relation to the outer dimensions of the radiator determines the degree to which a satisfactory radiator seating is obtained in the lateral holding plates. Because of the tolerances which have to be allowed, in some cases there may be unstable positioning of the radiator in the upper lateral rubber mountings. With regard to the support for the base of the radiator by means of a rubber and metal component, there is the danger that, as the result of external influences, particularly corrosion owing to the effect of weather, or salt water, the metal plates will become detached from the rubber bonded thereto, or from the associated threaded bolts, with the result that the radiator is no longer securely attached at its base.

In a further resilient three-point radiator mounting shown in German specification 883 570, a radiator is held in vertical slide guides on fixed frame parts of the vehicle by means of profiled rubber blocks and is resiliently secured at its base in a rubber bearer with a tensioning screw which secures the radiator to the chassis. In this case the upper lateral mountings using profiled rubber blocks are also subject to the defects arising from the tolerances which have to be allowed and the arrangement involves an elaborate configuration of the profiled rubber blocks and of the mounting parts surrounding them, so that the assembly is expensive and requires an undue amount of time for assembly because of the lower screwed connection for the radiator.

The present invention was devised with the intention of overcoming the above mentioned defects and providing a resilient three-point radiator mounting which, using simple components, is not of complicated construction and permits easy and rapid assembly of the radiator and provides a reliable and stable mounting.

In a resilient three-point radiator mounting according to the invention lateral mountings for the radiator are provided by plugs which positively engage in hollow rubber elements respectively arranged at each side of the radiator and are clamped to a fixed part of the vehicle frame, the radiator base being centrally supported by a pin in a hollow rubber element fixed to the frame. This arrangement provides a secure and stable radiator mounting which is independent of tolerances which have to be allowed in the dimensions of the frame and is moreover simple to construct and assemble therefore of low cost.

Advantageously the hollow rubber elements are in the form of short lengths of cylindrical tube and are held in cylindrical tubular sockets on the radiator. The hollow cylindrical rubber elements may be readily engaged by the plugs which pass through a fixed part of the vehicle frame and are positively retained in said part by means of a clamping device.

Advantageously the arrangement is such that the plugs, after engagement in the hollow rubber elements, are secured by means of a snap action, in the manner of a bayonet joint, against a holding plate fixed on the frame, by means of a flange adjoining the neck of the plug. Preferably also a part of the plug flange is provided at its periphery with two diametrically opposed recesses which can be snapped into corresponding lugs located on the holding plate, by rotational movement of the plugs.

The base of the radiator is preferably mounted by means of a pin which is secured to the radiator base and can be introduced into the central bore of a rubber block which snaps into an opening in a part of the vehicle frame.

The scope of the invention is defined by the appended claims; and the invention and the method by which it is to be performed are hereinafter particularly described with reference to the accompanying drawings in which:

Figure 1:
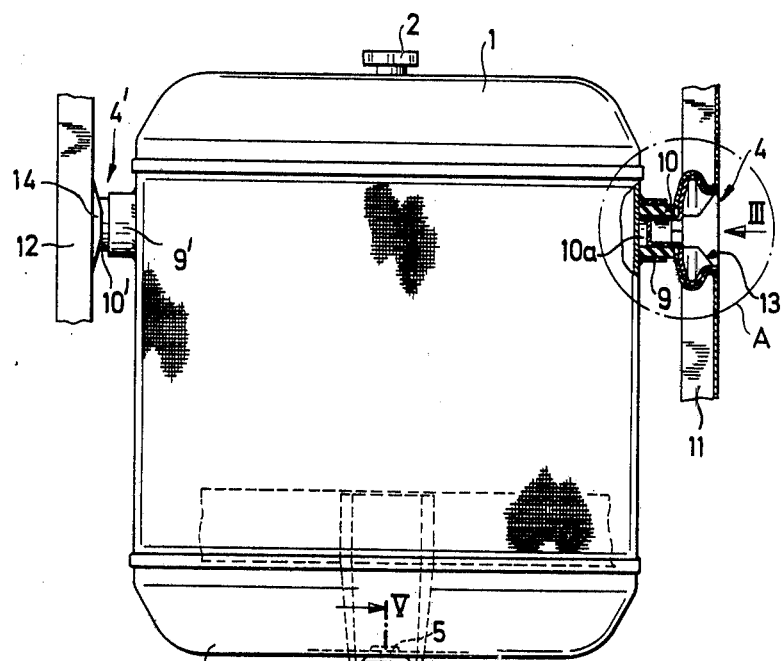
FIG. 1 is a part sectional front elevation of a radiator with a three-point mounting according to the invention.
Figure 5:
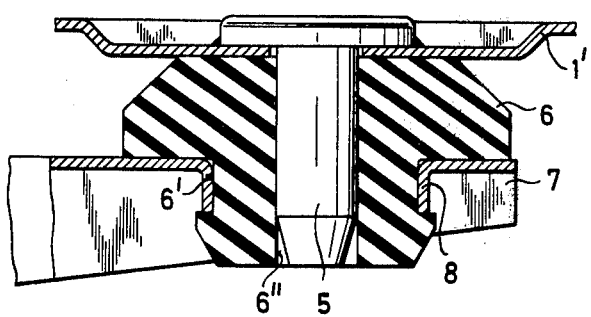
FIG. 5 is an enlarged section of the lower radiator mounting on the line V—V of FIG. 1.

FIG. 1 shows a radiator block 1 provided in known manner with a filler pipe 2 and supported in side portions of the vehicle frame in lateral mountings 4, 4' and supported at its base by means of a mounting 3 (FIG. 5) comprising a pin 5 secured to the base 1' of the radiator block or to a fixing strap (not shown) which extends around the radiator block, and a rubber block 6 having an annular groove 6' which engages in a frame member 7 of the front portion of the vehicle body by snapping into a tubular neck 8 formed in the frame member 7, the pin 5 extending through a central bore 6'' of the block 6.

Figure 4:
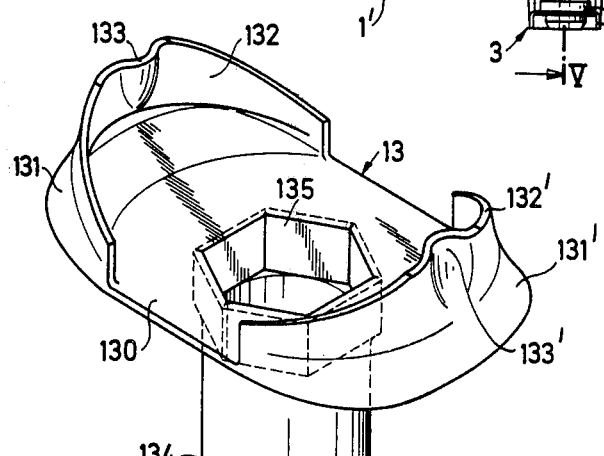
FIG. 4 is a perspective view of a plug forming part of the lateral radiator mounting.

The two lateral radiator mountings 4, 4' each consist respectively of a hollow cylindrical rubber element or sleeve 10, 10' held in cylindrical tubular sockets 9, 9' welded on to the radiator block or the fixing strap, and a plug 13 (FIG. 4) engaging in the cylindrical cavity 10a of the rubber element 10, 10' and locking in bayonet joint fashion on to parts of the vehicle frame 11, 12 adjacent the radiator block. Each plug is formed as a sheet metal stamping comprising a hollow cylindrical spigot 134 one end of which is closed and the other end of which is formed with an internal hexagonal contour 135 and is integral with a substantially radially extending flange 130, two diametrically opposed portions of which are folded partially back on themselves to form two shoulders 131, 131' which extend into upstanding arcuate collar portions 132, 132' each of which has impressed therein a central inwardly directed recess 133, 133'.

Figure 3:
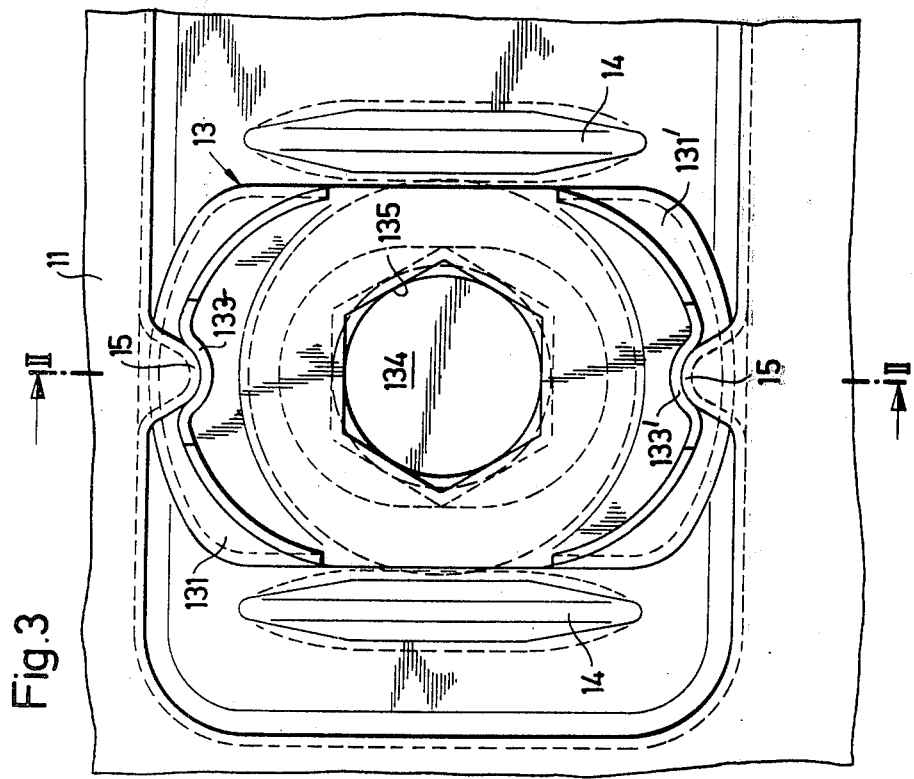
FIG. 3 is a side elevation, to the same scale as FIG. 2, of the lateral radiator mounting as viewed in the direction of the arrow 3 in FIGS. 1 and 2.

Each of the frame parts 11, 12 has a pair of horizontally spaced guide lugs 14 (FIG. 3); and each of the frame parts 11, 12 has an opening therein pressed out to form a short neck with two diametrically opposed pips or bulges 15 protruding radially inwardly therefrom.

Figure 2:
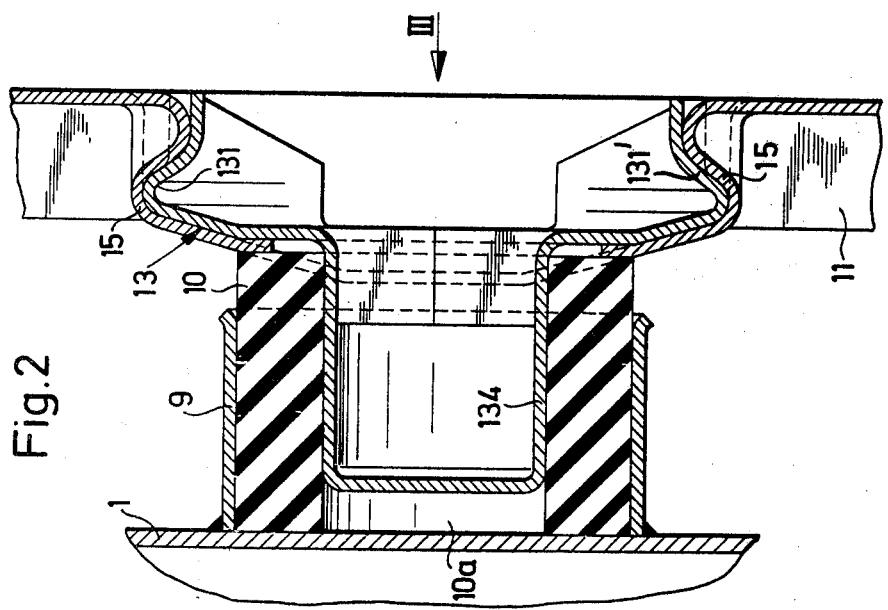
FIG. 2 is an enlarged view of the lateral radiator mounting shown within the circle A of FIG. 1 and corresponding to the section on the line II—II of FIG. 3.

Upon installation, the radiator block 1 is introduced from above between the frame parts 11, 12; and the sockets 9, 9' and rubber sleeves 10, 10' are pushed downwards between the pairs of guide lugs 14 until the pin 5 at the base of the block 1 drops into the lower rubber block 6. The two plugs 13 are then pushed through the openings in the frame parts 11, 12 until the tubular neck portions 134 of the plugs engage in the cavities 10a of the sleeves 10, 10'. The plugs 13 are then rotated by means of an Allen wrench until they are in the position shown in FIGS. 1, 2 and 3, the shoulders 131, 131' engaging in bayonet joint fashion behind the two pips 15 which also engage, with a snap fit action, with the recesses 133, 133' of the plugs, thus securing the plugs in their clamped positions. The radiator block 1 is thus secured in mountings which while holding it securely are resilient in the longitudinal direction of the vehicle and transversely thereto, and in a vertical direction.

I claim:
1. In a motor vehicle having a body with a horizontal frame part forming part of a lower mounting for the base of a radiator and two spaced vertical frame parts forming parts of two lateral mountings for said radiator, a radiator mounting assembly comprising a pin fixed on and depending from the base of said radiator centrally thereof; an elastomeric block fixed on said horizontal frame part, said block having therein an upwardly opening cavity in which said pin is engaged to locate said radiator base on said horizontal frame part; a pair of elastomeric elements respectively retained on opposite side portions of the radiator, each said element having therein a laterally opening cavity and said vertical frame parts each having an opening therein in substantial alignment with the cavity of the elastomeric element on the adjacent side of the radiator; and a pair of plugs respectively inserted in said vertical frame part openings from the outboard sides thereof, each said plug having a spigot portion which engages in the cavity of the elastomeric element adjacent thereto and a flange portion integral with said spigot portion, said vertical frame parts and said flange portions having interengaging formations by which said plugs are clamped to said vertical frame parts.

2. In a motor vehicle having a body with a horizontal frame part forming part of a lower mounting for the base of a radiator and two spaced vertical frame parts forming parts of two lateral mountings for said radiator, a radiator mounting assembly comprising a pin fixed on and depending from the base of said radiator centrally thereof; an elastomeric block snap-fitted in an opening in said horizontal frame part, said block having therein an upwardly opening cavity in which said pin is engaged to locate said radiator base resiliently on said horizontal frame part; a pair of cylindrical elastomeric elements respectively retained in cylindrical sockets on opposite side portions of the radiator, each said element having therein a laterally opening cylindrical cavity and said vertical frame parts each having an opening therein in substantial alignment with the cavity of the elastomeric element on the adjacent side of the radiator; and a pair of plugs respectively inserted in said vertical frame part openings from the outboard sides thereof, each said plug having a cylindrical spigot portion which engages in the cavity of the elastomeric element adjacent thereto and a flange portion integral with said spigot portion, said vertical frame parts and said flange portions having interengaging formations by which said plugs are clamped by a bayonet type connection to said vertical frame parts after insertion in said frame part openings.

3. A radiator mounting assembly as claimed in claim 2, the spigot portion of each said plug having adjacent the flange portion thereof a hexagonal portion whereby said plug can be rotated by an Allen wrench to make or release said bayonet type connection.

4. A radiator mounting assembly as claimed in claim 3, said opening in each said vertical frame part being formed in a neck portion pressed out from each said frame part, a pair of diametrically opposed protrusions on each said neck portion co-operating with a pair of diametrically opposed recesses formed on said flange portion of each said plug to form said bayonet type connection.

5. A radiator mounting assembly as claimed in claim 4, said vertical frame parts having guide lugs formed thereon to locate said radiator with the cavities in said elastomeric elements in alignment with the openings in said vertical frame part openings when the radiator is installed on said horizontal frame part.

* * * * *